Sept. 29, 1964     N. H. HORTON     3,150,835
DRILLING CLAY PROCESS AND PRODUCT
Filed July 5, 1960
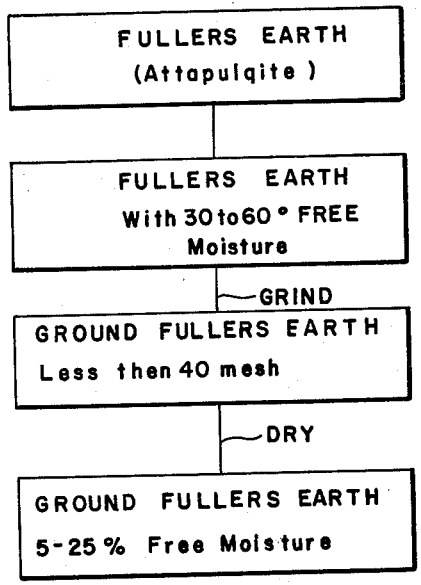
INVENTOR
*Norman H. Horton*
BY *Cushman, Darby & Cushman*
ATTORNEYS

United States Patent Office 3,150,835
Patented Sept. 29, 1964

3,150,835
DRILLING CLAY PROCESS AND PRODUCT
Norman H. Horton, Tallahassee, Fla., assignor to Floridin Company
Filed July 5, 1960, Ser. No. 40,702
14 Claims. (Cl. 241—16)

The present invention relates to a new and improved drilling mud and method of producing the same. This product is prepared from a fuller's earth type of clay, notably attapulgite clay.

The primary object of the invention is to provide a drilling mud clay of the fuller's earth type capable of being dispersed in water to obtain a thixotropic system and in which liquid dispersion there will be held in suspension the rock fragments obtained during the drilling of an oil well if the drill is at rest so they do not sediment and form a cake around the drill and shaft and in which, when the drill is working, the dispersion presents a minimum of resistance to the operation of the drill and the liquid carrying the rock fragments or sand has a low viscosity so that it can be easily removed from the bore hole by pumping, said clay consisting essentially of a fuller's earth type containing attapulgite, the clay having a particle size substantially less than 40 mesh, a free moisture content of about 5% to 25% and when dispersed in water, the repulsive and attractive force of the clay dispersion being so adjusted that a thixotropic system is created which fulfills the requirements of an effective drilling mud.

A further object is to provide a method of producing a clay as above described comprising disintegrating the clay to have a particle size substantially less than 40 mesh, while it retains its high free moisture content and subsequently drying the clay.

I have found that one of the principal uses of Florida-Georgia fuller's earth containing attapulgite is as a drilling fluid in the drilling of oil wells. Attapulgite is particularly useful for this purpose when salt water conditions are encountered, as attapulgite is not easily flocculated by electrolyte systems as is bentonite. In processing of Florida fuller's earth for use as a drilling clay, there was attempted a process which involves primary crushing of crude clay, drying in rotary kilns to a moisture content well under 30% to 0, and then grinding to a fine powder on dry grinding equipment, such as a Raymond Roller Mill.

I have found that fine grinding of attapulgite impairs the desirable viscosity properties which make the clay useful as a drilling fluid. Many of the desirable characteristics of attapulgite as a drilling fluid can be attributed to the nature of the individual attapulgite particles which are long, needle-like spicules. Fine grinding of attapulgite at low free moisture content results in altering of these spicules as evidenced by loss of desirable viscosity properties. It is also evidenced by comparison of electron micrographs of the clay made prior to fine grinding and after fine grinding. In particular, fine grinding at low free moisture content causes greater damage than fine grinding at higher free moistures. As a result, an improved superior grade of attapulgite, according to our laboratory results, can be prepared for use as a drilling clay by disintegration of the crude clay having about 30% to 60% free moisture, usually about 45% free moisture to the final particle size desired, i.e. by grinding at the high free moisture content to substantially less than 40 mesh, followed by drying to the desired free moisture specification of the product, e.g. between about 5% and 25%. The process is shown diagrammatically in the drawing. That is to say, a superior clay is produced by thin slicing or thin shaving or disintegrating the same by means of a wire brush and, in fact, by other methods such as reducing the particle size of the crude as by grinding in an organic volatile solvent medium such as benzene or as by spray drying a water-clay dispersion. In all cases the clay retains its high free moisture content of about 30% to 60%, and then after grinding, if necessary, drying to approximately 5–25% free moisture. On the other hand, the slices or granules prepared by the methods described for disintegration, possess gelling characteristics superior to that of a predried and subsequent finely ground material. For example, drilling clay processed by disintegration of the crude to approximately 16/50 mesh followed by drying to approximately 11% free moisture produced 125 barrels of 15 centipoise mud per ton of clay. This same clay when processed by the usual method of first drying the clay and then fine grinding with a laboratory Raymond Mill gave a powder which produced only 88 barrels of 15 centipoise mud per ton of clay. This demonstrates that the particulated type drilling clay processed according to the improved methods outlined above possesses enhanced quality for use as a drilling fluid.

In connection with the preparation of the drilling mud, comprising disintegrating the crude clay having a high moisture content grinding in an organic medium, e.g., carbon tetrachloride, which is immiscible with water, is also useful and a high shear device, such as represented by a Waring Blendor is employed. The clay is dispersed in the organic medium and after disintegration, is then filtered and the organic filtrate recovered for further use. The resultant clay is in a finely divided state and contains organic, volatile solvent. It is then dried under conditions suitable for solvent recovery. A crude clay processed in this manner has superior gelling characteristics as a result of the disintegration at high free moisture content. A number of organic liquids are suitable, such as carbon tetrachloride, mentioned above, as well as benzene, and other organic liquids which are immiscible with water and so long as they be volatilized of evaporated off.

Reference is had to the prior art wherein the Hartshorn Patent 2,079,854 describes a product the particle size of which after extrusion is not suitable for drilling mud. Extrusion takes place with the clay in a highly plastic condition. As a result of this high plasticity, the clay assumes the shape of the aperture and is extruded as rods.

The problem of how to disintegrate the crude attapulgite clay (which contains approximately 45% free moisture) to particles of approximately (minus 60) −60 mesh has been a matter of some effort. The currently preferred method according to the invention is a wire brushing process in which the crude clay is fed to a high-speed wire brush through a brick making type die plate on the extrusion machine. The particles which are brushed off are then dried. A brushing process, in accordance with the present invention, will be subsequently described.

The patent to Montgomery, No. 1,939,860, notes that dry grinding of diatomaceous earth causes breaking of the particles, and avoids such damage by grinding under water. This undoubtedly works for a non-gelling material, such as diatomaceous earth, but would not be suitable for a drilling mud prepared from fuller's earth, e.g. attapulgite, because of the gelling characteristics required of the mud.

I have found that any type of fine grinding damages the gelling qualities of attapulgite. On ball milling a 5% slurry of attapulgite and water, the viscosity of the suspension decreases. This is also true when a slurry is disintegrated too long with a Waring Blendor.

A portion of clay was distingrated in a salad maker and dried to approximately 0% F.M. Of this dried clay one portion was dispersed and the other portion was ground in the laboratory Raymond Mill before dispersion.

It will be noted in the sample which was ground, that there are an appreciably greater number of spicules of short length than in the unground sample.

In my development work I was able to produce drilling muds which have viscosity values greater than 200 barrels of 15 centipoise mud per ton of clay.

It is generally conceded that the viscosity properties of fuller's earth are in large measure due to the nature of the individual particles of the principal mineral constituent of fuller's earth, commonly known as attapulgite. Attapulgite clay mineral exists as lath-like particles or spicules, usually well oriented in aggregates in the crude clay. On dispersion in water these oriented spicules are disturbed from their regular orientation and distributed throughout the suspending medium as more or less individual spicules, or aggregates consisting of several spicules. The important viscosity properties of fuller's earth, such as thixotropy, etc., are due to the number and shape of these dispersed particles. A high quality crude clay for drilling mud use and a poor quality crude clay each contains spicules of the same length. On a per pound basis, a high quality crude contains a greater number of spicules of optimum length than does the poorer quality crude and it follows that the spicules of the higher quality crude are more delicate and fragile than those of the lower quality crude. It is the purpose of this invention to process attapugite clay in such fashion so that the delicate spicule particles are preserved during the processing.

In order to protect the spicules, the clay is processed to its final particle size while still containing high amounts of free moisture. Under these conditions, the spicules have been found to be more flexible and are more difficult to fracture.

With the above concepts in mind, there was reviewed every step in the processing of attapulgite clays to make sure that the clay is not damaged by such processing. In order to investigate processing on a laboratory scale, a high quality crude (95.5 bbl./t. by usual test methods) was obtained and sliced on a rotary salad cutter. These slivers of clay were then dried under a variety of conditions and tested for viscosity quality. Portions of the dried clay were ground on the laboratory Raymond Mill and tested. The results are tabulated below:

| Type Clay | Drying Time | Free Moisture | Bbl./T[1] as is | Bbl./T. after grinding |
|---|---|---|---|---|
| Salad Cut Cheseborough Crude—Split 4 times, 300 g. portions, placed in Aluminum Cake pans and dried in Dispatch Oven at 105° C. (221° F.) | 0 | 46.1 | [2] 114 | Too wet. |
| | 30 min | 37.9 | [3] 132 | Too wet. |
| | 50 min | 31.8 | 124 | 116. |
| | 80 | 13.5 | 123 | 98. |
| | 110 | 8.2 | 121 | 98. |
| | 140 | 0.8 | 118 | 84. |
| | 200 | 1.3 | 121 | 88. |
| | Air Dried | 10.0 | 121 | 95. |
| Same Salad Cut, Clay Dispatch Oven Set at 150° C. (302° F.) | 20 min | 29 | 129 | 107. |
| | 30 min | 16.6 | 162 | 101. |
| | 18 hrs | 0 | 107 | Less than 77. |
| Same clay, Oven at 175° C. (347° F.). | 15 min | 26.6 | 128 | 107. |
| | 25 min | 16.87 | 123 | 106.5. |
| | 5 hrs | 0 | 111 | 75. |
| Marvin Owens Crude Salad Cut—Oven Dried at 125° C. (257° F.). | 40 min | 23.8 | 92 | 94. |
| Marvin Owens Crude −4 Mesh. | 40 min | 12.8 | 94 | 81. |

[1] Bbl./T.=Barrels per ton as determined by the method contained in "Standard Field Procedure for Testing Drilling Fluids," API, RP 29, 4th Ed., May 1957.
[2] Not completely dispersed.
[3] Free moisture content of sample not uniform.

The laboratory results show that contrary to previous opinion, it is difficult to permanently impair the viscous property of attapulgite by drying to too low a free moisture content after grinding or disintegration. As evidence, it will be noted that a sample dried 18 hours at 300° F. still had a bbl./t. value of 107.

EXAMPLE 1

Further laboratory results indicated that the addition of moisture will restore the viscosity properties which are reduced as a result of avid drying. A sample of the salad cut Cheseborough clay was dried three hours at 125° C. to a free moisture of 0°. This sample tested 98 bbl./t. When the free moisture was increased to 29% by use of an atomized mist of water, the same clay tested 120 bbl./t. The dried clay after grinding tested 84 bbl./t. The ground clay did not recover viscosity on increase of free moisture. This data is summarized in the following diagram.

*Salad Sliced Cheseborough Crude*

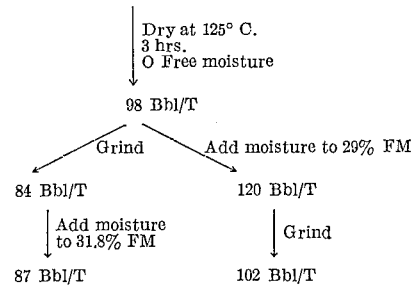

The results of the foregoing examples are summarized as follows:

(1) Drying to low free moisture may have transient harmful effect on attapulgite clays to be used for drilling mud. No permanent damage results if the temperature does not exceed 350° F. or higher for short periods of time. Addition of moisture restores the viscosity properties of unground clay. Moisture may be added as an atomized mist or by exposure to moist air.

(2) Grinding damages drilling mud clay severely, if done at low free moistures. Damage is surprisingly less severe at higher free moistures. No method has been found for restoring viscosity properties damaged as a result of grinding.

A further development for making a drilling clay, incorporating the principle of grinding the crude clay to final particle size specifications prior to drying and particularly exemplifying another method of disintegration involves the use of a wire brush and offers considerable advantage as shown in the following example.

EXAMPLE 2

This setup consisted of wire brushes mounted on a rotating mandrel so that a brush surface six inches in diameter and seven inches long results This brush was operated at about 1750 r.p.m. (but may be operated at lower or faster speeds if desired). The clay is fed to the brush by a low pressure extrusion method somewhat similar to a brick-making type extrusion.

As a modification of this example, the clay is pressed into bricks or lumps and the blocks then fed to the brush by a conveyor belt.

The brush in each instance engaged the surface of the clay mass and the disintegrated clay particles are thrown off the brush and picked up in an air stream. The clay laden air was conducted to a flash dryer.

In another instance, the wet clay was collected in a cyclone for drying at a later time in the flash or other dryer.

I have found this method of disintegration offers certain advantages:

(1) The particle size of the product is better than in other methods tried. Practically all the material will pass a forty-mesh screen.
(2) Particle size can be controlled by changing brush speed and/or bristle size of brush.
(3) Particles produced by brushing show superior dispersion and quality over particles produced by other methods. This is particularly evident in an aging effect which has been noted with brushed particles compared to particles produced by the salad maker used in a previous example. For instance, a sample which test 125 bbl./t. by salad slicing, gives 158 bbl./t. on brushing. After aging for one week, the salad sliced sample was 129 bbl./t. The brushed sample was 165 bbl./t. Drying was the same for each sample.

This demonstrates the value of brushing as a means of disintegrating crude fuller's earth for drilling mud use. There has been produced a drilling mud which tests over 200 bbl./t. by methods which have been outlined. Previous quality by conventional processing, was about 85 bbl./t.

As will be appreciated the ideal characteristics of a drilling mud are (1) a high viscosity, so as to entrain and carry off cuttings released by the drill and (2) thixotropy, so as to prevent sedimentation of said cuttings when a quiescent state is assumed.

Therefore while the usual method of producing a drilling mud from attapulgite involved primary crushing of crude clay, drying it in a rotary kiln to a low moisture content of about 0 to 30%, and then grinding it to a fine powder, the present invention produces a drilling mud more advantageously by distintegrating the crude clay having a free moisture content of above 30% (usually about 45%), and with better results than the previously proposed treatment, which this invention displaces.

As pointed out, the practice of grinding the attapulgite at a low free-moisture content has seriously impaired its physical properties for use as a drilling mud. Fine grinding at low free-moisture content results in the fracturing of the spicules, the long needle-shape of which imparts to the drilling mud the desired properties of viscosity and thixotropy. Therefore, an important object of the present invention is to provide a simple and efficient method of producing a drilling mud from a Florida-Georgia type clay or fuller's earth containing attapulgite, wherein the physical properties are so substantially improved, as to effect an improved drilling mud. Additionally, the methods of producing a drilling mud from attapulgite, according to this invention result in a clay of the type described, in which the fracture of the individual particles of the principal mineral constituent, attapulgite (which are commonly known as spicules) is substantially reduced, whereby to impart to the drilling mud clay and the mud improved physical properties.

A clay having improved properties according to the invention can be formed as follows:

EXAMPLE 3

In this example, the sliced or crushed crude is first dried to zero free-moisture, and the free-moisture then replaced or reconstituted by an aqueous atomized mist to a free moisture content of 30%. Thereafter, the reconstituted clay was ground to the desired size and dried to the desired free-moisture content.

EXAMPLE 4

Another suitable method of disintegrating the crude clay as indicated above comprised grinding in an organic volatile medium immiscible with water, namely benzene, by use of a high shear device. In the laboratory I successfully used a Waring Blendor for this purpose. There are commercial apparatus which will exert such high shear on large volumes of material. The clay dispersed in the organic medium is then filtered and the organic filtrate is recovered for further use. The resulting clay is in a finely divided state, e.g., less than 60 mesh depending on length of time of disintegration. Drying is accomplished under conditions suitable for solvent recovery.

A number of organic fluids are suitable in addition to carbon tetrachloride and benzene as long as these other organic liquids are volatile and immiscible with water.

EXAMPLE 5

The required conditions for a drilling mud clay are also met by mechanically dispersing the crude clay in water and spray drying the suspension. Nongelling materials such as sand and rock are removed easily in such a process. This type processing represents excellent processing for drilling mud. Unfortunately, the cost of such processing may be excessive. The methods of this invention may be used to accomplish the same results as, dispersion of the clay and spray drying without having to remove the large quantities of water introduced in the spray-drying method.

The laboratory results along with the considerations already mentioned establish conditions for processing the highest quality drilling mud from clays or fuller's earth typified by attapulgite clays. The most important single condition is disintegration of the crude at highest free moisture possible, e.g., 30% to 60%.

From the foregoing it will be understood that in the practice of this invention to improve the performance characteristics of the drilling mud, the crude clay containing attapulgite is primarily crushed and disintegrated having its original or high free moisture content of about 30% to 60% usually about 45% to a size substantially less than 40 mesh and subsequently dried by suitable methods to a desired free moisture content of about 0% to 30% generally 10%.

It is to be understood that the foregoing methods of producing a drilling mud from attapulgite, a Florida-Georgia type clay, are merely illustrative of preferred embodiments, and that such changes may be made as fall within the purview of one skilled in the art without departing from the spirit of the invention and the scope of the appended claims.

In the accompanying drawing is set forth a diagrammatic flow sheet illustrating the process of disintegrating clay according to the invention.

I claim:

1. The method of producing a clay of the fuller's earth type capable of being dispersed in water to obtain a thixotropic system, the clay having a particle size substantially less than 40 mesh, and, said clay, when dispersed in water, forming a dispersion having repulsive and attractive forces so adjusted that a thioxtropic system is created, said method comprising disintegrating crude clay to have a particle size substantially less than 40 mesh, while said crude clay possesses a high free moisture content of 30% to 60%.

2. The process according to claim 1 wherein the disintegration is carried out by slicing the crude clay into thin slices.

3. The process according to claim 1 wherein the disintegration is carried out by shaving the crude clay into thin slices.

4. The process according to claim 1 wherein the disintegration is carried out by engaging the clay with a wire brush.

5. The process according to claim 1 wherein the disintegration is carried out by forming the clay under light pressure into lumps and then engaging the clay with a wire brush.

6. The process according to claim 1 wherein the disintegration is carried out by extruding the clay under light pressure into blocks and then engaging said blocks with a wire brush.

7. The process according to claim 1 wherein the disintegration is carried out by grinding in a volatile organic medium.

8. The process according to claim 1 wherein the disintegration is carried out by mechanically dispersing the crude clay in water and spray drying the same.

9. The process according to claim 1 wherein the disintegration is carried out by using a high shear device.

10. The process according to claim 1, wherein the clay at a temperature not exceeding 350° F. is subsequently dried.

11. The method of producing a clay of the Georgia-Florida fuller's earth type capable of being dispersed in water to obtain a thixotropic system, the clay having a particle size substantially less than 40 mesh, and, said clay, when dispersed in water, forming a dispersion having repulsive and attractive forces so adjusted that a thixotropic system is created, said method comprising adjusting the free moisture content of said clay to about 30% to 60%, disintegrating the clay to have a particle size substantially less than 40 mesh, while said clay possesses a moisture content of about 30% to 60%.

12. The process according to claim 11, wherein the clay at a temperature not exceeding 350° F. is subsequently dried.

13. A method according to claim 11 wherein the clay at a temperature not exceeding 350° F. is dried to below 10% free moisture and the clay subsequently restored to its desirable properties by reconstitution with water to bring the free moisture content above 10%.

14. The method of claim 13 wherein the clay at a temperature not exceeding 350° F. is dried to a moisture content between about 10 and 18%.

References Cited in the file of this patent

UNITED STATES PATENTS

| | | |
|---|---|---|
| 1,939,860 | Montgomery | Dec. 19, 1933 |
| 2,079,854 | Hartshorne | May 11, 1937 |
| 2,231,328 | Fitzsimmons | Feb. 11, 1941 |
| 2,363,876 | La Lande | Nov. 28, 1944 |